US009742869B2

(12) United States Patent
Bolotin et al.

(10) Patent No.: US 9,742,869 B2
(45) Date of Patent: Aug. 22, 2017

(54) APPROACH TO ADAPTIVE ALLOCATION OF SHARED RESOURCES IN COMPUTER SYSTEMS

(71) Applicant: NVIDIA CORPORATION, Santa Clara, CA (US)

(72) Inventors: Evgeny Bolotin, San Jose, CA (US); Zvi Guz, San Jose, CA (US); Adwait Jog, State College, PA (US); Stephen William Keckler, Austin, TX (US); Michael Allen Parker, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 623 days.

(21) Appl. No.: 14/101,255

(22) Filed: Dec. 9, 2013

(65) Prior Publication Data

US 2015/0163324 A1    Jun. 11, 2015

(51) Int. Cl.
*H04L 29/08* (2006.01)
(52) U.S. Cl.
CPC ................................ *H04L 67/327* (2013.01)
(58) Field of Classification Search
CPC ............. H04L 47/2441; H04L 12/5693; H04L 47/6215; H04L 2012/5632; H04L 47/522; H04L 41/0896; H04L 47/52; H04L 47/521; H04L 47/60; H04L 49/205; H04L 49/254; H04L 49/3018; H04L 41/5009; H04L 47/24
See application file for complete search history.

(56) References Cited

U.S. PATENT DOCUMENTS

| 5,179,702 | A | * | 1/1993 | Spix | ........................ | G06F 8/41 |
| | | | | | | 711/E12.006 |
| 5,377,352 | A | * | 12/1994 | Tanaka | ...................... | G06F 9/52 |
| | | | | | | 712/244 |
| 5,794,073 | A | * | 8/1998 | Ramakrishnan | ...... | G06F 13/364 |
| | | | | | | 710/22 |
| 6,067,557 | A | * | 5/2000 | Hegde | ................... | G06F 9/4881 |
| | | | | | | 718/102 |
| 9,288,148 | B1 | * | 3/2016 | Krishnaswamy | ... | H04L 41/0893 |
| 9,436,389 | B2 | * | 9/2016 | Lee | ......................... | G06F 3/061 |
| 2002/0178282 | A1 | * | 11/2002 | Mysore | .............. | H04L 12/5693 |
| | | | | | | 709/234 |
| 2004/0059855 | A1 | * | 3/2004 | Yang | ..................... | G06F 13/102 |
| | | | | | | 710/260 |

(Continued)

*Primary Examiner* — Sargon Nano
(74) *Attorney, Agent, or Firm* — Artegis Law Group, LLP

(57) ABSTRACT

A request management subsystem is configured to establish service classes for clients that issue requests for a shared resource on a computer system. The subsystem also is configured to determine the state of the system with respect to bandwidth, current latency, frequency and voltage levels, among other characteristics. Further, the subsystem is configured to evaluate the requirements of each client with respect to latency sensitivity and required bandwidth, among other characteristics. Finally, the subsystem is configured to schedule access to shared resources, based on the priority class of each client, the demands of the application, and the state of the system. With this approach, the subsystem may enable all clients to perform optimally or, alternatively, may cause all clients to experience an equal reduction in performance.

23 Claims, 8 Drawing Sheets

(56) References Cited

U.S. PATENT DOCUMENTS

| | | | | |
|---|---|---|---|---|
| 2005/0071563 A1* | 3/2005 | Kuttanna | ............... | G06F 9/383 |
| | | | | 711/119 |
| 2005/0071599 A1* | 3/2005 | Modha | ................ | G06F 9/5016 |
| | | | | 711/170 |
| 2006/0064697 A1* | 3/2006 | Kagi | ................ | G06F 9/5011 |
| | | | | 718/103 |
| 2006/0080486 A1* | 4/2006 | Yan | ................ | G06F 9/5038 |
| | | | | 710/123 |
| 2007/0277152 A1* | 11/2007 | Srinivasan | ............... | G06F 8/20 |
| | | | | 717/119 |
| 2008/0212472 A1* | 9/2008 | Musacchio | .............. | H04Q 3/68 |
| | | | | 370/232 |
| 2008/0244209 A1* | 10/2008 | Seelam | ................ | G06F 3/061 |
| | | | | 711/168 |
| 2010/0083262 A1* | 4/2010 | Gulati | ................ | G06F 9/5011 |
| | | | | 718/102 |
| 2011/0268052 A1* | 11/2011 | Koc | .............. | H04L 5/003 |
| | | | | 370/329 |
| 2013/0339635 A1* | 12/2013 | Amit | ................ | G06F 9/5061 |
| | | | | 711/154 |
| 2014/0181428 A1* | 6/2014 | Hsu | ................ | G06F 12/00 |
| | | | | 711/154 |
| 2014/0373021 A1* | 12/2014 | Teixeira | ............... | G06F 9/5038 |
| | | | | 718/103 |

* cited by examiner

APPROACH TO ADAPTIVE ALLOCATION OF SHARED RESOURCES IN COMPUTER SYSTEMS

GOVERNMENT RIGHTS IN THIS INVENTION

This invention was made with U.S. government support under LLNS subcontract B599861 awarded by DOE, and with government support under agreement No. HR0011-13-3-0001 awarded by DARPA The U.S. government has certain rights in this invention.

BACKGROUND OF THE INVENTION

Field of the Invention

Embodiments of the present invention relate generally to computer processing and, more specifically, to an approach to adaptive allocation of shared resources in computer systems.

Description of the Related Art

Computer systems in general, and graphics processing units (GPUs) in particular, often include multiple clients that operate in parallel. The clients could be hardware clients such as processing engines, or software clients such as parallel threads, among other possibilities. Generally, parallel clients rely on shared resources that the computer system provides. Some examples of shared resources include memory, interconnect, cache bandwidth, and memory bandwidth. Clients typically must compete for access to shared resources, and, thus, the performance of each client and the overall computing system depends on the availability of those shared resources.

For example, in a computer system where access to a shared memory is limited, the performance of clients within that computer system could depend on the ability of those clients to read data from and write data to the shared memory. If a first client issues a read request to the shared memory, then the shared memory could be occupied for a period of time servicing the read request. If a second client issues a write request while the shared memory is busy servicing the read request, then the second client simply must wait until the shared memory is finished servicing the read request before the write request can be serviced. Consequently, the second client may stall, which would affect the performance of that client. As a general matter, if multiple clients issue access requests to a shared resource concurrently, in many practical cases, the shared resource can only process those requests sequentially, potentially causing those clients to underperform.

One problem with the approach described above is that clients have many different types of behaviors that oftentimes serve to monopolize a shared resource. For example, an "aggressive" client could issue a large number of access request to the shared resource in a short amount of time, thereby "hogging" the shared resource (as is known in the art). A less aggressive client could only issue a few access requests, and would thus be forced to wait for quite some time. If the less aggressive client was latency-sensitive, then that client could crash altogether due to the behavior of the aggressive client. In short, conventional computer systems make no provisions for allocating shared resources based on the requirements of the different clients that are active within the computer system.

As the foregoing illustrates, what is needed in the art is a more effective approach to allocating shared resources in computer systems that institutes more fairness across clients.

SUMMARY OF THE INVENTION

One embodiment of the present invention sets forth a computer-implemented method for scheduling access requests for a shared resource, including receiving a first access request for the shared resource from a first client that is associated with a first service class, storing the first access request in a first queue that corresponds to the first service class, receiving a second access request for the shared resource from a second client that is associated with a second service class, storing the second access request in a second queue that corresponds to the second service class, determining that access requests issued by clients associated with the second service class should be serviced before access requests issued by clients associated with the first service class, and scheduling the second access request to be serviced by the shared resource before the first access request is serviced by the shared resource.

One advantage of the disclosed approach is that resources are allocated based on the requirements of each parallel client as well as the state of the system. Further, the disclosed approach enables all concurrent clients to perform optimally or, alternatively, to experience an equal reduction in performance across all concurrent clients.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
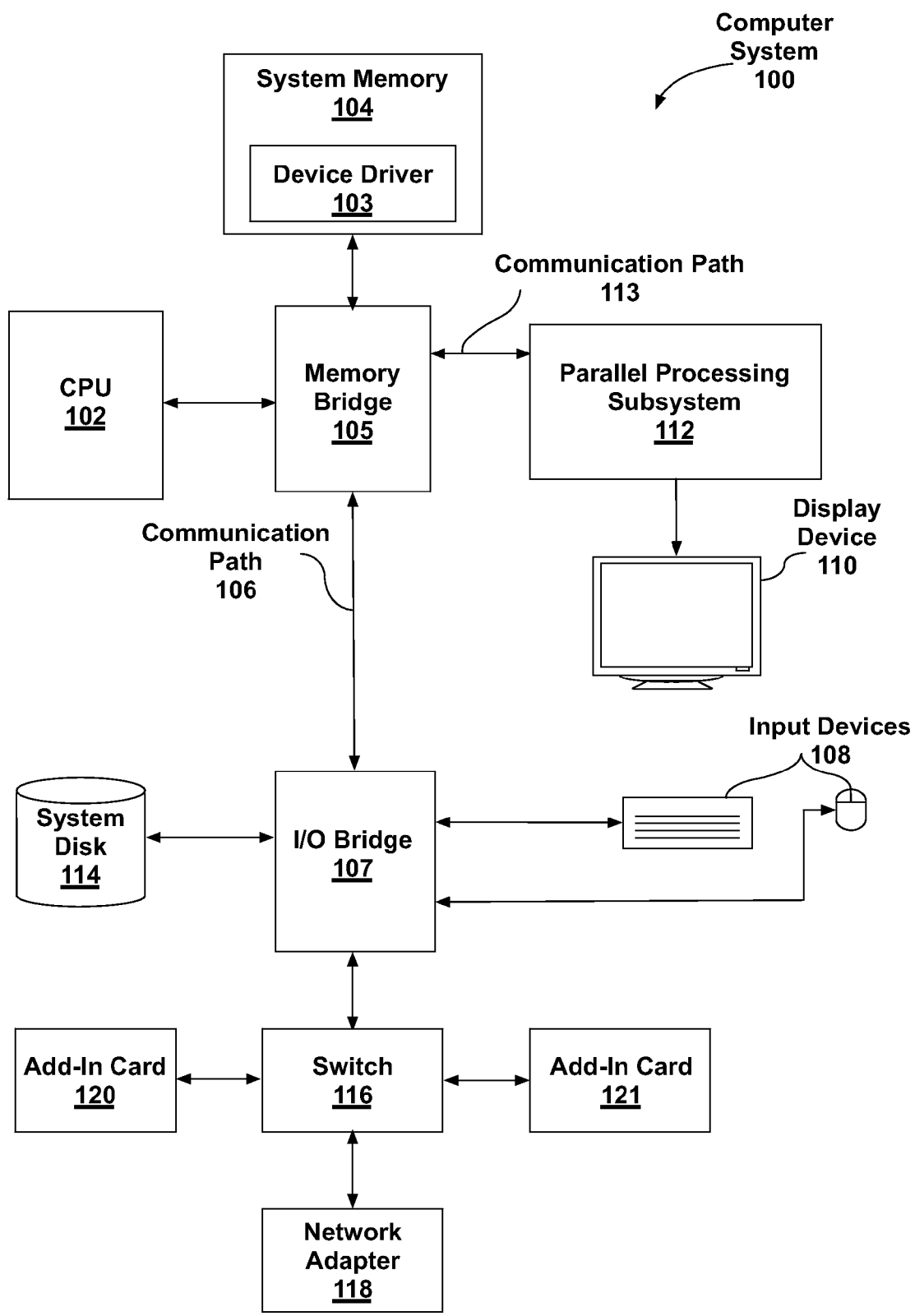
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 and I/O bridge 107 each may be any technically feasible type of memory bridge. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
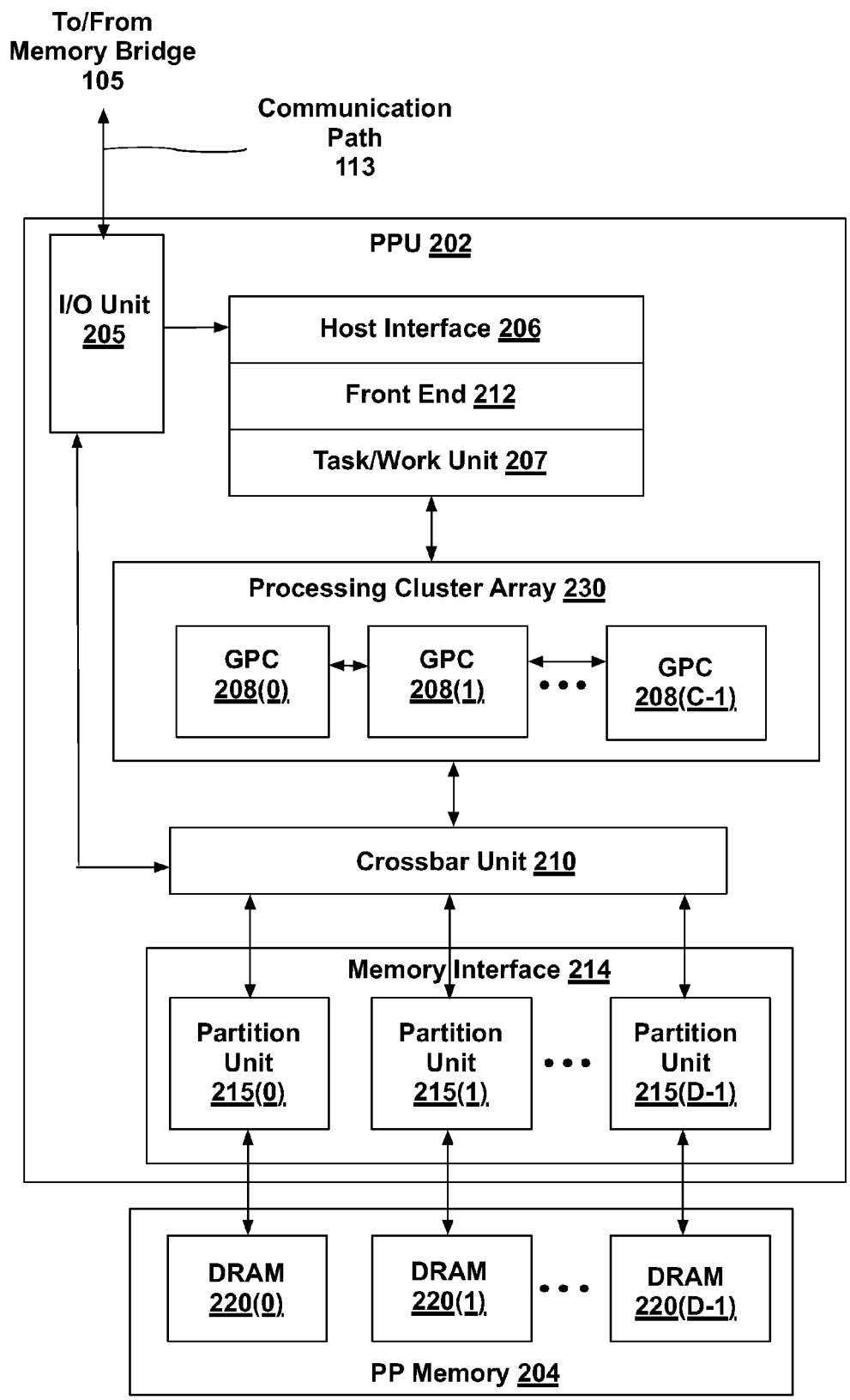
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
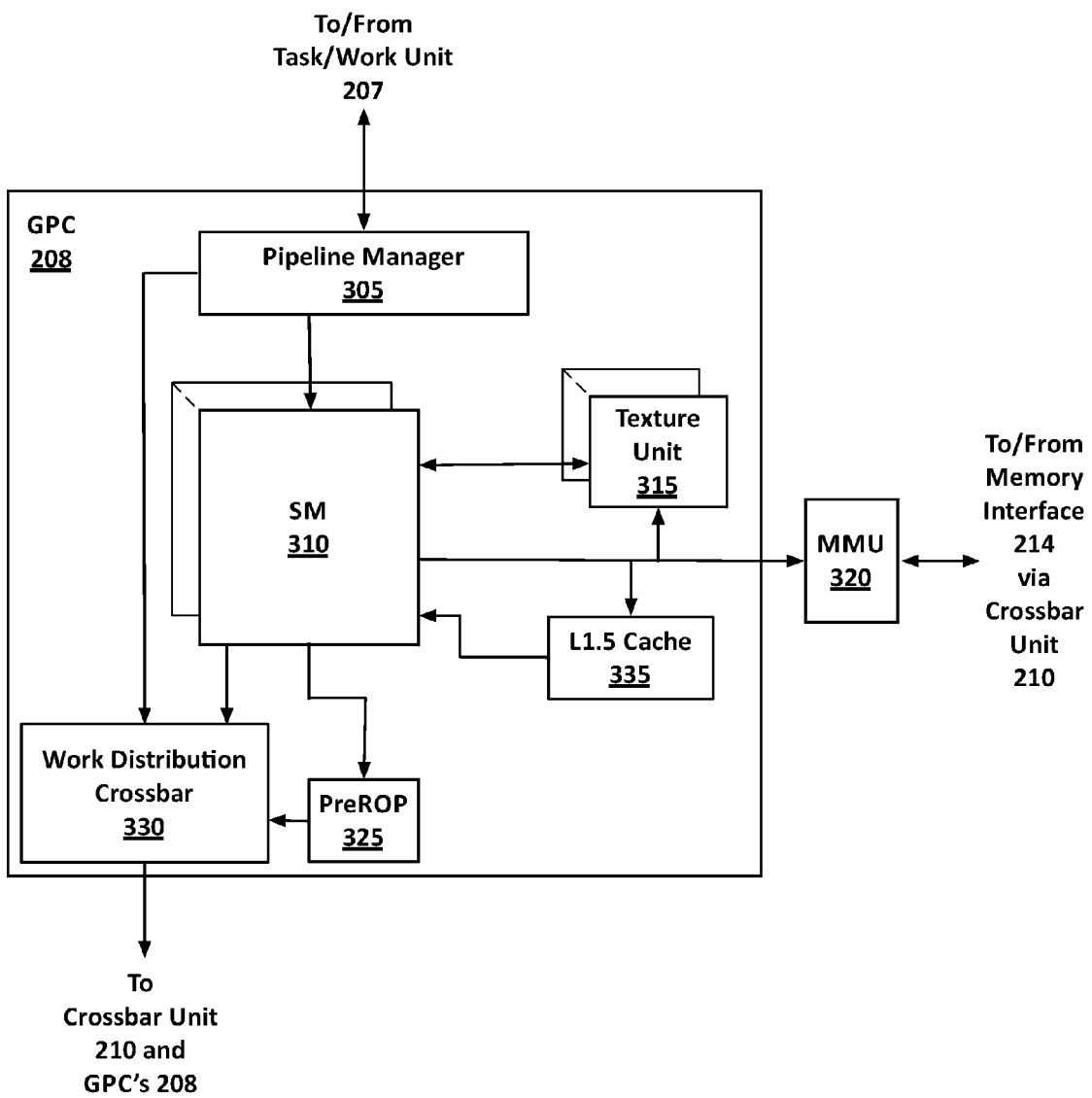
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The 12 caches may be used to transfer data between threads. Finally, SMs 310 also have access to off-chip "global" memory, which may include PP memory 204 and/or system memory 104. It is to be understood that any memory external to PPU 202 may be used as global memory.

Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Adaptive Allocation of Shared Resources

Figure 4A:
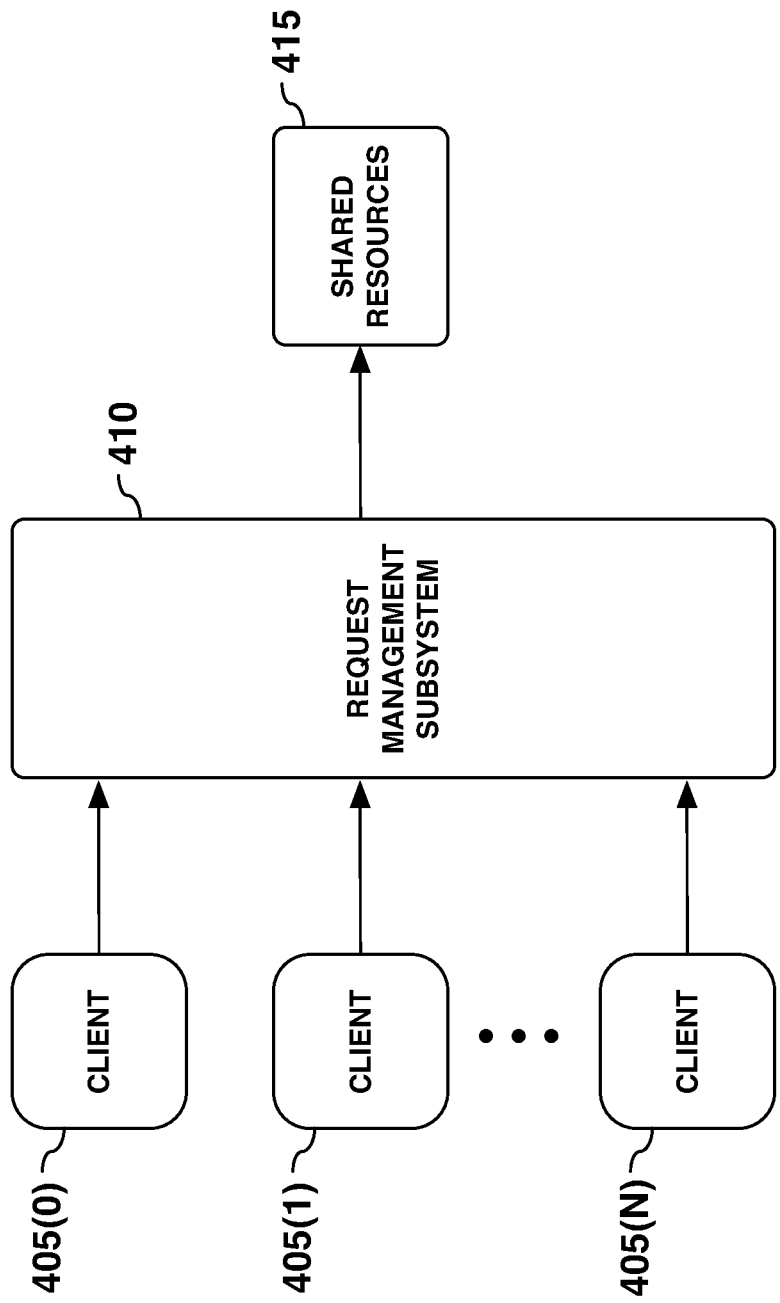
FIGS. 4A-4C are conceptual diagrams of a request management subsystem configured manage access requests for a shared resource on behalf of multiple clients, according to various embodiments of the present invention.

FIG. 4A is a conceptual diagram of a request management subsystem 410 configured to manage access requests for shared resource 415 on behalf of multiple clients 405, according to one embodiment of the present invention. As shown, N clients 405 are coupled to request management subsystem 410 that, in turn, is coupled to shared resources 415. Request management subsystem 410 is generally configured to arbitrate between access requests received from clients 405 for access to shared resources 415 using multiple internal queues. In doing so, request management subsystem 410 attempts to provide shared resource access to clients 405 according to the needs of those clients and overall system throughput and fairness considerations.

Clients 405 may include hardware entities, software entities or various combinations of the two. For example, and without limitation, a given client 405 could be CPU 102 of FIG. 1, GPC 208 of FIG. 2, or SM 310 of FIG. 3. Clients 405 could also include software applications configured to execute on various hardware units, including those mentioned above. Clients 405 may reside within a multicore CPU system, a mobile system-on-chip system, a server system, or other such systems. As a general matter, clients 405 include any sort of hardware or software configured to issue access requests for shared resources 415 and potentially compete with one another for access to that resource.

As one non-limiting example of a configuration of clients 405, client 405(0) could be a hardware unit running a software application, while 405(1) could be a different hardware unit running a different software application, where both applications require access to shared resources 415. In another exemplary configuration, client 405(0) and 405(1) could be two different software applications, contending for shared resources 415. In still another exemplary configuration, client 405(0) could be a hardware unit running two different software applications, while 405(1) could be a different hardware unit running different portions of the same two software applications. The possible configurations can be extended to any number of hardware units and software applications arranged in a wide variety of different combinations.

Shared resource 415 may include any limited system resource for which clients 405 compete to gain access. For example, and without limitation, shared resource 415 could be a memory unit that clients 405 rely upon to store data. Multiple clients 405 may read data to and write data from the memory unit, although the memory unit may be capable of handling only limited serial operations. Alternatively, shared resource 415 could include an interconnect on which clients depend for access other elements within computer system 100, where pathways within that interconnect may be limited in number, bandwidth, and other characteristics. Additionally, shared resource 415 could include a cache unit that clients use for temporary data storage for computed values that typically require rapid future access.

Request management subsystem 410 may be implemented between any collection of clients 405 and any shared resource 415 within computer system 100. For example, and without limitation, if clients 405 include GPCs 208 of FIG. 2, then shared resource 415 could include DRAMs 220. Request management subsystem 410 could manage the access of GPCs to DRAMs 220 for data storage. Alternatively, shared resources 415 could include crossbar unit 210, and request management subsystem 410 could facilitate the access of GPCs 208 to crossbar unit 210. Additionally, if clients 405 include SMs 310 of FIG. 3, then request management subsystem 410 could distribute requests from SMs 310 to L1.5 cache 335. As still another example, request management subsystem 410 could distribute requests from SMs 310 to GPCs 208 via work distribution crossbar 330.

As described in greater detail below in conjunction with FIG. 4B, request management subsystem 410 is configured to assign service classes to each client 405, where each service class represents a primary characteristic of a request or client 405 responsible for the request. A primary characteristic could be, for example, latency sensitivity, quality of service needed, level of latency tolerance, or amount of bandwidth needed. Request management subsystem 410 then groups requests associated with similar service classes together, and assigns access requests associated with each different service class to a dedicated internal queue. Request management subsystem 410 then schedules requests from the different queues based on a scheduling policy that reflects the current status of the clients, the current status of the shared resource, and other system-level status information.

With this approach, request management subsystem 410 provides clients with access to resources according to the needs of each client. Accordingly, all clients may receive access to shared resources 415 that allows improved performance. Alternatively if resources are limited, all clients may receive access to shared resources 415 that affords an equal reduction in performance across all clients. In this manner, no client is deprived of service, and no client is subjected to an unfair reduction in performance. The internal configuration of request management subsystem 410 is described in greater detail below in conjunction with FIG. 4B.

Figure 4B:
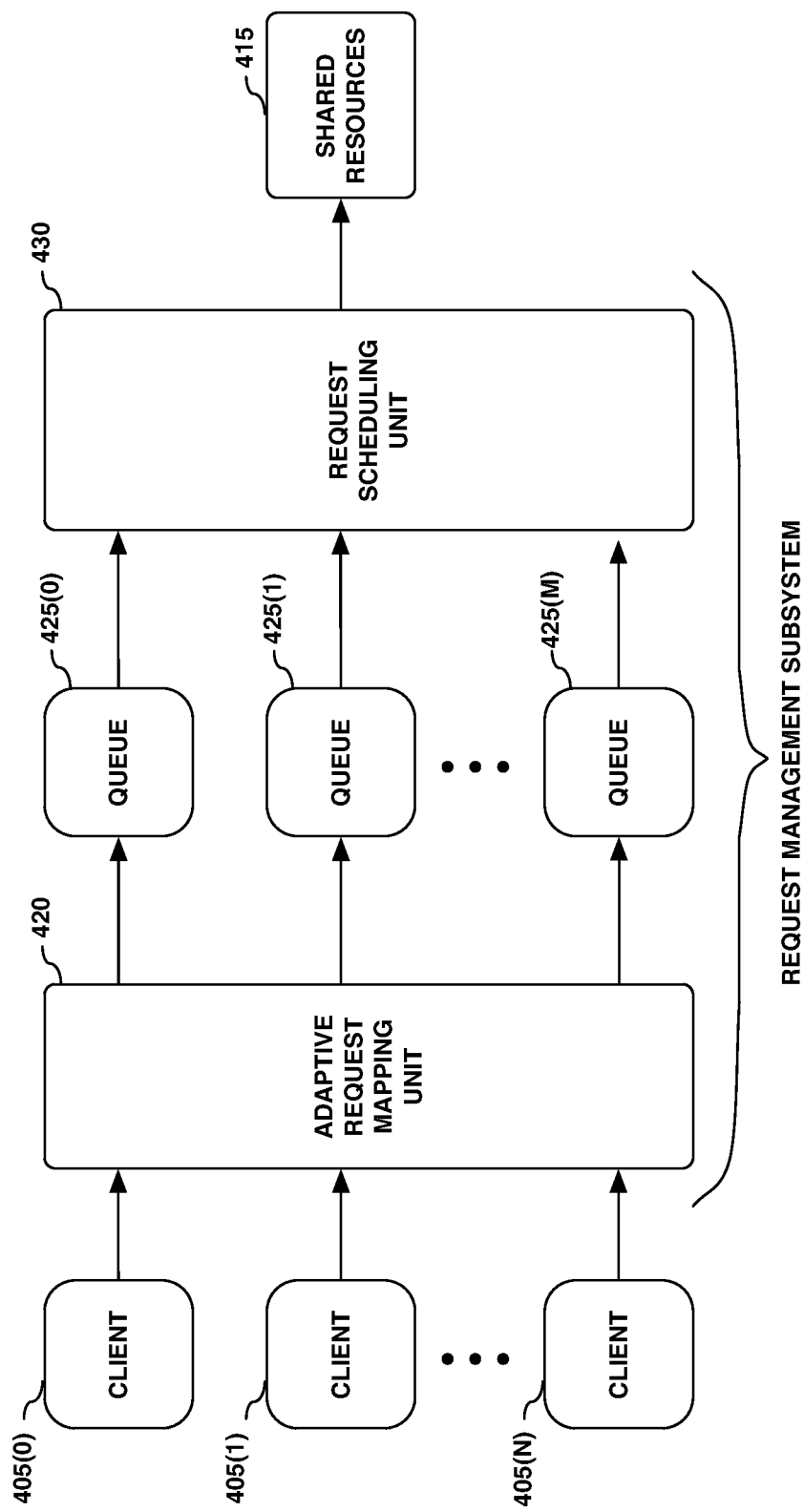

FIG. 4B illustrates the request management subsystem 410 of FIG. 4A in greater detail, according to one embodiment of the present invention. As shown, request management subsystem 410 includes adaptive request mapping unit 420 coupled to queues 425 that, in turn, are coupled to request scheduling unit 430. Adaptive request mapping unit 420 may be implemented in hardware or software or in hardware operating in conjunction with software. For example, driver 103 within system memory 102 of FIG. 1 may implement the functionality of adaptive request mapping unit 420 when executed by CPU 102 or PPU 202. Alternatively, a hypervisor executing within system 100 may perform the functionality of adaptive request mapping unit 420.

Adaptive request mapping unit 420 assesses clients 405 for priority, similarity of performance characteristics, and similarity of resource utilization, among other metrics, and assigns clients 405 to service classes. Each service class reflects a primary characteristic of a request, or characteristics of the client 405 responsible for the request. Again, a characteristic could be, for example, sensitivity to latency variations, quality of service dependencies, degree of latency tolerance, or minimum allocated bandwidth. Adaptive request mapping unit 420 may then receive access requests from clients 405 to acquire access to shared resource 415 and then queue those requests within queues 425 based on the service classes associated with those requests.

Queues 425 are first-in-first-out hardware storage media into which adaptive request mapping unit 420 maps requests from clients 405. Queues 425 may be constructed in a number of different ways. In practice, adaptive request mapping unit 420 allocates an addressable block of memory. Then, during configuration, the block is segmented into individual queues by assigning head pointers and tail pointers indicating the starting and ending locations of each queue within the memory block. A memory block with, for example, one hundred locations, 0 to 99, could be divided into ten queues with ten positions in each queue. Head and tail pointers would be assigned in ten location intervals. Generally, a memory block could have any number of locations, and could be divided up into any number of segments that each represents a queue 425. The number of elements in each segment need not be equal, and so the size of each queue 425 may differ. Each queue 425 may also be implemented as dedicated hardware, among other possibilities. Persons skilled in the art will understand that queues 425 could be implemented in any technically feasible fashion.

Each queue 425 is associated with one or more service classes, as mentioned above. For example, queue 425(0) could be dedicated to latency sensitive requests, while queue 425(1) could be dedicated to bandwidth sensitive requests. If a given client 405 has low instruction or thread level parallelism to hide access latency upon requesting access to shared resources 415, and, as a result, that client frequently cannot continue processing until requests are serviced, then the client 405 would be assigned to queue 425(0) that is dedicated to latency sensitive requests (in this particular example). Alternatively, if a client 405 has considerable parallelism, such that client 405 does not halt operation while requests 445 are processed, client 405 would be assigned to a queue 425(1) that is dedicated to bandwidth sensitive requests (again, in this particular example). A single queue 425 generally has at least one associated service class, but could handle multiple service classes with similar characteristics. In the most general case, the number of queues 425 could equal the number of clients 405 times the number of service classes, although in practice, typically just one queue 425 is configured for each service class.

Request scheduling unit 430 draws requests from queues 425 and then forwards those requests to shared resources 415. Request scheduling unit 430 arbitrates among queues 425 based on analysis of the characteristics and performance metrics of the queues 425, performance characteristics of shared resources 415, and guidance provided by adaptive request mapping unit 420. In this manner, requests from clients 405 are prioritized to reflect a variety of different metrics. Request scheduling unit 430 selects requests from queues 425 and forwards the selected requests serially to shared resources 415. In this manner, request scheduling unit 430 may allow one high-priority stream of requests to reach shared resources 415 before another lower priority stream of requests based on client, system, and queue specific metrics.

Figure 4C:
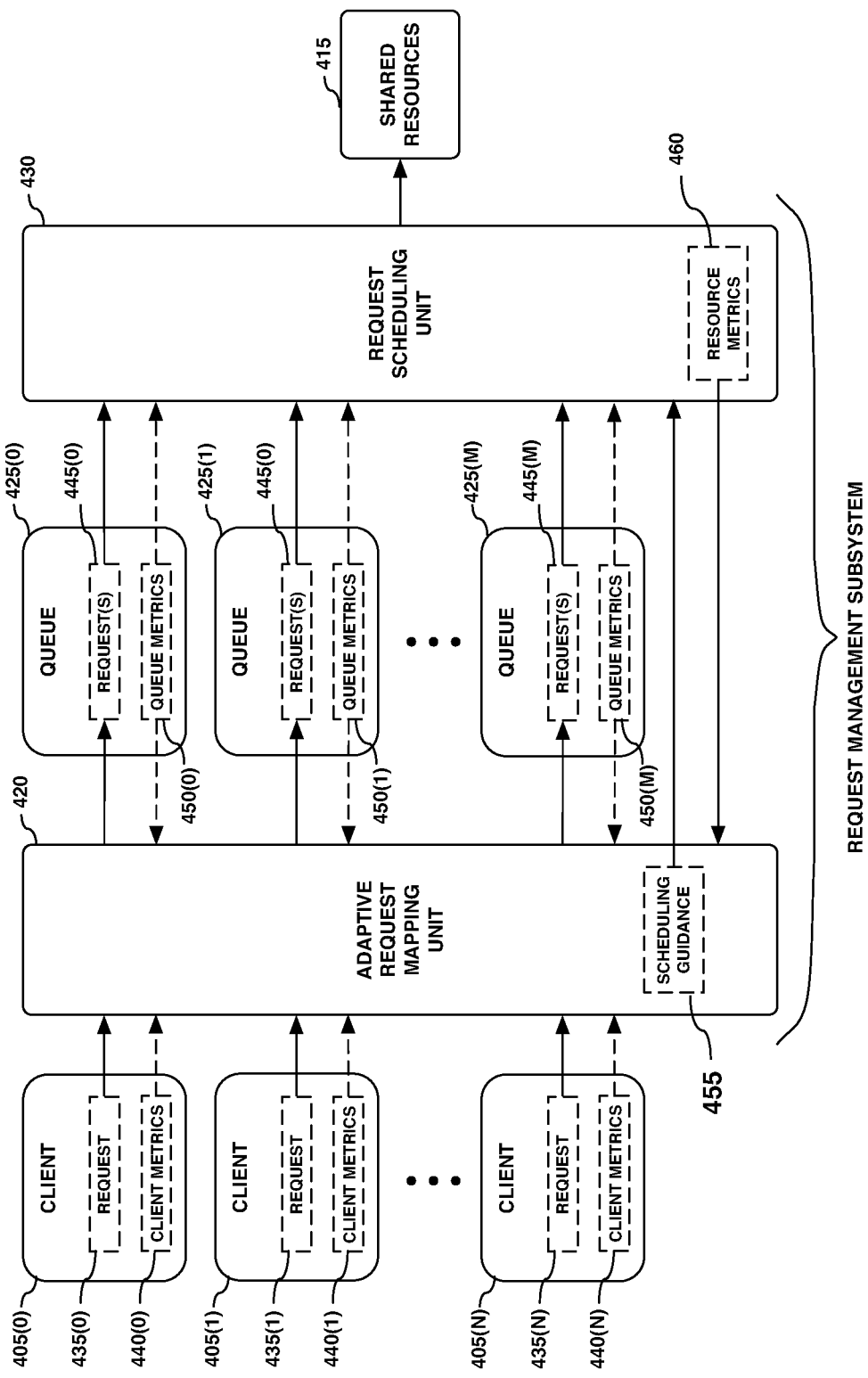

FIG. 4C illustrates an example implementation of the request mapping subsystem of FIG. 4B, according to one embodiment of the present invention. As shown, clients 405 within request management subsystem 410 include requests 435 and client metrics 440, adaptive request mapping unit 420 includes scheduling guidance 455, queues 425 include requests 445 and queue metrics 450, and request scheduling unit 430 includes resource metrics 460.

Prior to operation, adaptive request mapping unit 420 performs a series of configuration operations to prioritize requests 435. Priority may be assigned statically, where a client is pre-defined to have priority or explicitly request a certain priority. Alternatively, priority may be determined dynamically based on operational characteristics provided by client metrics 440 and queue metrics 445, as well as resource metrics 460. For example, a given client 405 could operate in a manner that reflects particular characteristics that would be captured by client metrics 440. Adaptive request mapping unit 420 could assign a service class to the client 405 dynamically depending on the changing characteristics of that client over time, allowing the client to migrate between service classes (and corresponding queues 425).

During configuration, adaptive request mapping unit 420 first establishes service classes, then groups service classes according to similarity. Service classes may be set up statically with a priori knowledge of the system hierarchy or may be dynamically determined, as mentioned above. Each queue 425 is also established to accommodate a corresponding service class or group of service classes. Adaptive request mapping unit 420 then observes the request-to-response characteristics of requests clients 405 have placed into queues for servicing by shared resources 415. Adaptive request mapping unit 420 thereby characterizes clients 405 and shared resources 415, as well as the overall system status, and generates scheduling guidance 455 to reflect that characterization. Request scheduling unit 430 evaluates scheduling guidance 455 and schedules requests according to that guidance.

In operation, a client 405(0) initiates a request 435(0). Adaptive request mapping unit 420 assigns client 405(0) to a service class, performs any applicable grouping, and ranks the request 435(0). Adaptive request mapping unit 420 then forwards request 435(0) to the appropriate queue 425, for example, to queue 425(M), as request 445(M). When request scheduling unit 430 has determined the state of shared resources 415 and evaluated scheduling guidance 455, as described above, request scheduling unit 430 forwards request 445(M) to shared resources 415 in the determined order.

Request scheduling unit 430 then collects the status of the shared resources 415 by evaluating the speed of execution, the acknowledgement or response to request 445(M), and other relevant metrics, and dispatches this information to adaptive request mapping unit 420. Adaptive request mapping unit 420 further collects client metrics 440 and generates an analysis of the overall system state and formulates scheduling guidance 455, which is forwarded to request scheduling unit 430 in the fashion mentioned previously. Adaptive request mapping unit 420 may reassign or reallocate clients 405 to alternate service classes depending on client metrics 440, queue metrics 450, and system characterization.

With this approach, request management subsystem 410 provides improved system performance in that all clients 405 are afforded access to shared resources 415 according to need and priority. If shared resources 415 are restricted, scarce, or otherwise insufficient to satisfy all clients 405, request management subsystem 410 allocates shared resources 415 in such a manner that all clients 405 will function with equal shortfall from optimum. Alternatively, even if shared resources 415 are sufficient, a client 405 that may have more aggressive requirements will be tempered so that a less aggressive client will not be excessively restricted. In this manner, all clients will operate optimally.

Figure 5:
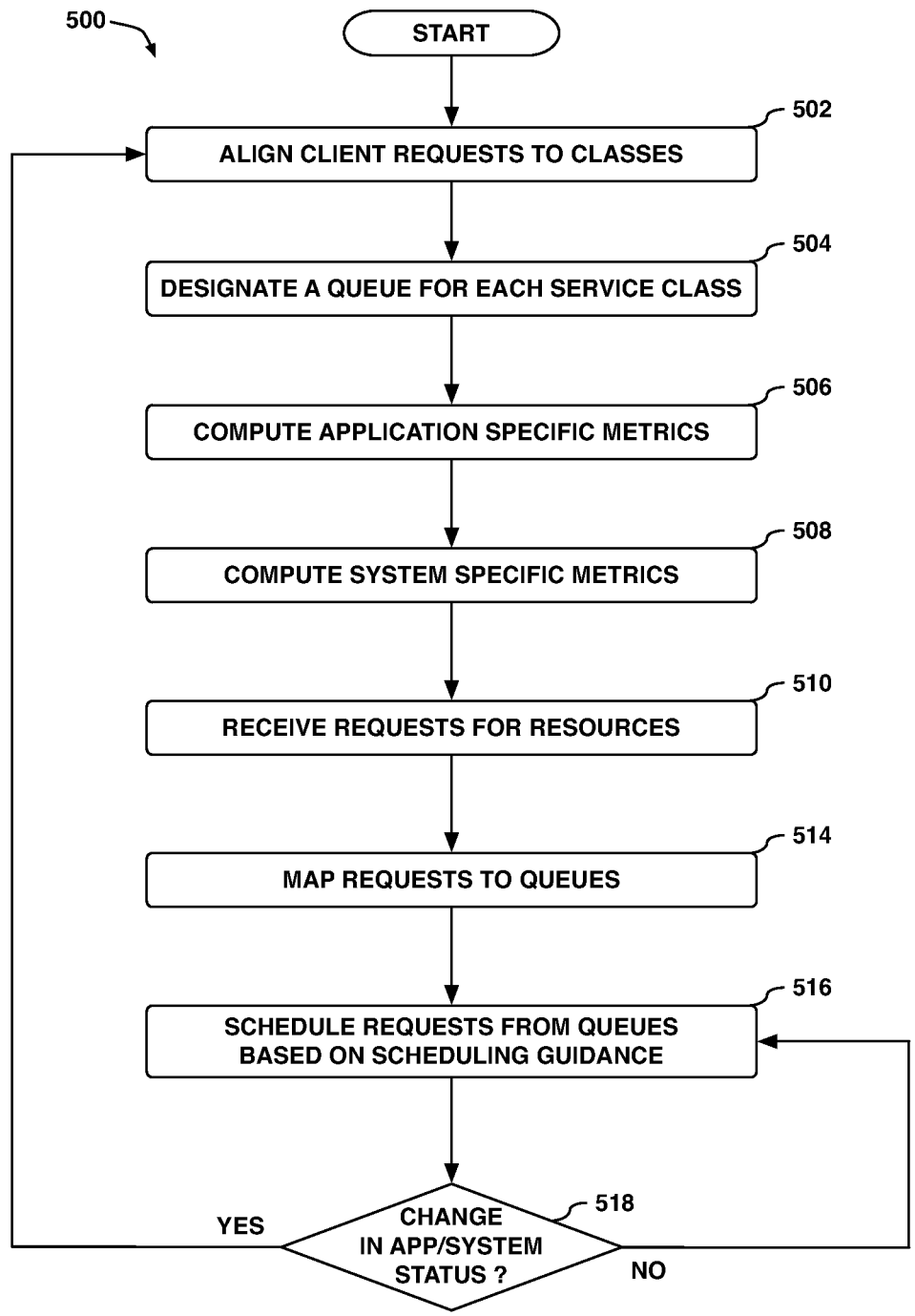
FIG. 5 is a flow diagram of method steps for managing requests for a shared resource on behalf of multiple clients, according to one embodiment of the present invention.

FIG. 5 is a flow diagram of method steps for managing requests for a shared resource on behalf of multiple clients, according to one embodiment of the present invention. Although the method steps are described in conjunction with the systems of FIG. 1-4C, persons skilled in the art will understand that any system configured to perform the method steps, in any order, is within the scope of the present invention.

As shown, a method 500 begins at step 502, where adaptive request mapping unit 420 assigns clients 405 to service classes by assessing priority, similarity of performance characteristics, and similarity of resource utilization, among other metrics. The method 500 then proceeds to step 504. At step 504, adaptive request mapping unit 420 designates a request queue 425 for each service class. The method 500 then proceeds to step 506. At step 506, adaptive request mapping unit 420 collects client metrics 435 from each client 405. The method 500 then proceeds to step 508. At step 508, adaptive request mapping unit 420 collects queue metrics 450 from each queue 440 as well as resource metrics 460 from request scheduling unit 430 and then computes overall system specific metrics.

The method 500 then proceeds to step 510. At step 510, adaptive request mapping unit 420 receives requests 435 from clients 405. The method 500 then proceeds to step 514. At step 514, adaptive request mapping unit 420 maps requests 435 to queues 425 based on the service class associated with each such request.

The method 500 then proceeds to step 516. At step 516, request scheduling unit 430 schedules requests 445 from a selected queue 425 to shared resources 415. The method 500 then proceeds to step 518. At step 518, adaptive request mapping unit 420 and request scheduling unit 430 reevaluate the state of the system. If, at step 518, adaptive request mapping unit 420 and request scheduling unit 430 determine that a change in the client 405 status or in the system status has not occurred, then the method 500 returns to step 516 where request scheduling unit 430 continues to schedule requests 445 as before. If, at step 518, adaptive request mapping unit 420 and request scheduling unit 430 determine that a change in the client 405 status or in the system status has occurred, then the method 500 returns to step 502 and proceeds as described above.

Figure 6:
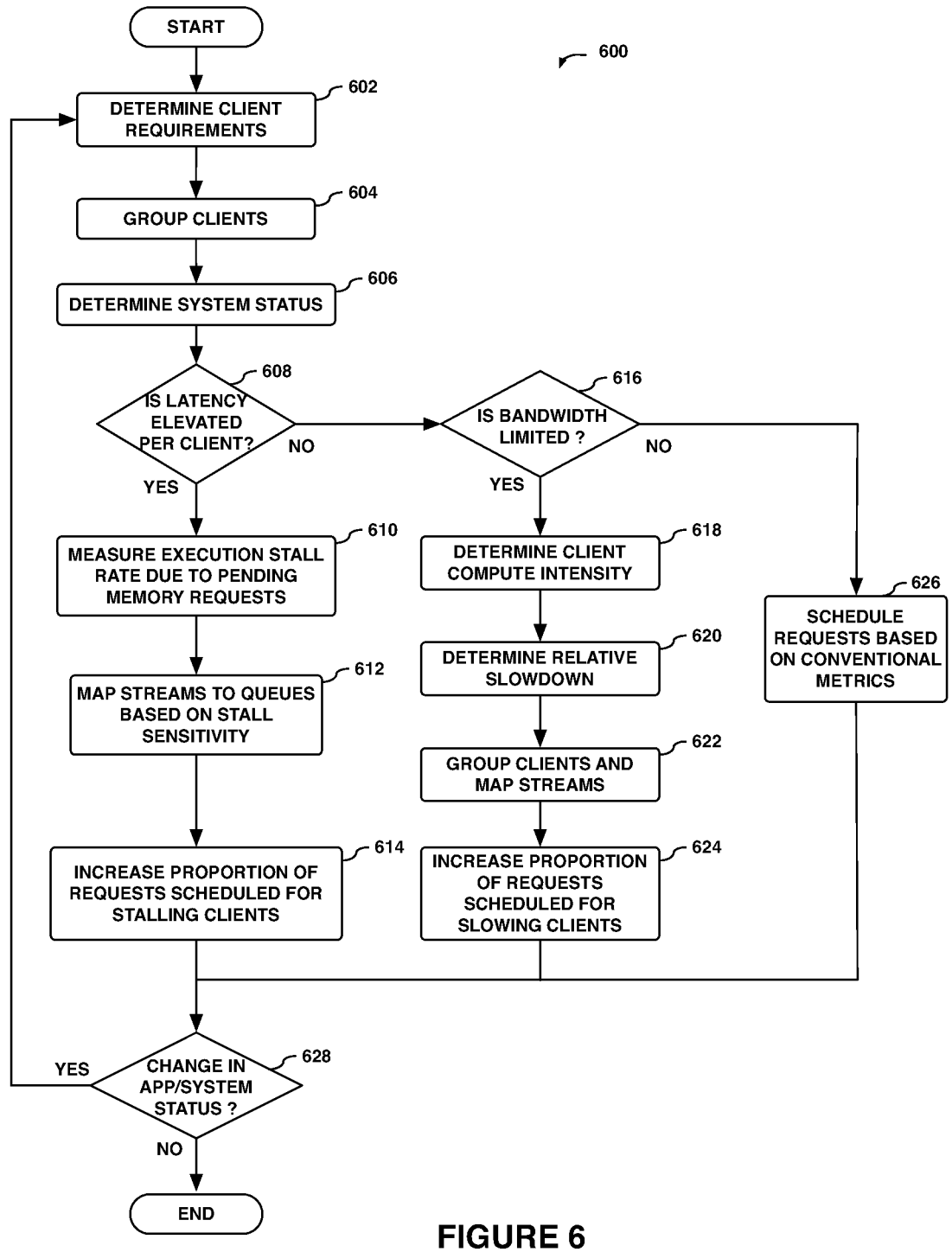
FIG. 6 is a flow diagram of method steps for prioritizing requests for a shared memory resource based on a set of metrics, according to one embodiment of the present invention.

With the approach described in conjunction with FIG. 5, any type of shared resource may be allocated between different clients 405. FIG. 6, described below in greater detail below, represents one exemplary application of those techniques to allocating a shared memory resource between clients.

FIG. 6 is a flow diagram of method steps for prioritizing requests for shared memory resources, according to one embodiment of the present invention. Although the method steps are described in conjunction with the systems of FIG. 1-4C, persons skilled in the art will understand that any system configured to perform the method steps, in any order, is within the scope of the present invention.

As shown, a method 600 begins at step 602, where adaptive request mapping unit 420 determines client 405 requirements by assessing clients 405 for priority, frequency of memory access, and bandwidth utilization requirements, among other metrics. The method 600 then proceeds to step 604. At step 604, adaptive request mapping unit 420 groups clients 405 into service classes and assigns each class to a request queue 440. The method 600 then proceeds to step 606. At step 606, adaptive request mapping unit 420 determines the overall system state by collecting application metrics 440 from each client 405, collecting queue metrics 450 from each queue 425, and receiving resource metrics 460 from request scheduling unit 430. The method 600 then proceeds to step 608.

At step 608, adaptive request mapping unit 420 determines, by further evaluating resource metrics 460, if system latency has increased. If, at step 608, resource metrics 460 indicates that system latency has increased, then the method 600 proceeds to step 610. At step 610, adaptive request mapping unit 420 determines the execution stall rate by further evaluating client metrics 440. The method 600 then proceeds to step 612. At step 612, request mapping unit 420 maps streams of requests 435 to queues 425 based on the stall sensitivity of each client 405 request 435. The method 600 then proceeds to step 614. At step 614, request scheduling unit 430 increases the proportion of requests 445 scheduled for stalling clients 405. The method 600 then proceeds to step 628.

Returning now to step 608, if resource metrics 460 indicate that system latency has not substantially increased, then the method 600 proceeds to step 616. At step 616, adaptive request mapping unit 420 determines, by further evaluating resource metrics 460, if bandwidth is limited. If, at step 616, resource metrics 460 indicates that bandwidth is limited, then the method 600 proceeds to step 618. At step 618, adaptive request mapping unit 420 determines the compute intensity of client 405 by further evaluating client metrics 440. The method 600 then proceeds to step 620. At step 620, adaptive request mapping unit 420 determines the relative slowdown of clients 405 by further evaluating clients metrics 440. The method 600 then proceeds to step 622. At step 622, adaptive request mapping unit 420 maps streams of requests 435 to queues 425. At step 624, request scheduling unit 430 increases the proportion of requests 445 scheduled for slowing clients.

Returning now to step 616, if resource metrics 460 indicates that system bandwidth is not limited, then the method 600 proceeds to step 626. At step 626, request scheduling unit 430 schedules requests 445 from queues 440 based on conventional metrics. The method 600 then proceeds to step 628. At step 628, adaptive request mapping unit 420 evaluates client metrics 415, queue metrics 450, and resource metrics 460 to determine if a change in client 405 status or in the system status has occurred. If, at step 628, adaptive request mapping unit 420 determines that a change in the client 405 status or in the system status has occurred, then the method 600 returns to step 602 to reevaluate the state of the system. If, at step 628, adaptive request mapping unit 420 determines that a change in the client 405 status or in the system status has not occurred, then request scheduling continues, and the method 600 concludes.

Although the method 600 is described as a specific example of allocating a shared memory resource across clients, without limitation, persons skilled in the art with understand that the techniques described thus far are equally applicable to allocating any shared resource across two or more clients.

In sum, a request management subsystem is configured to establish service classes for clients that issue requests for a shared resource on a computer system. The subsystem also is configured to determine the state of the system with respect to bandwidth, current latency, frequency and voltage levels, among other characteristics. Further, the subsystem is configured to evaluate the requirements of each client with respect to latency sensitivity and required bandwidth, among other characteristics. Finally, the subsystem is configured to schedule access to shared resources, based on the priority class of each client, the demands of the application, and the state of the system. With this approach, the subsystem may enable all clients to perform optimally or, alternatively, may cause all clients to experience an equal reduction in performance.

One advantage of the approach disclosed herein is that the resource management subsystem allocates scarce resources based on the particular requirements of each client as well as the state of the system. Further, the resource management subsystem prevents applications that may be particularly intensive in resource requirements from monopolizing scarce resources at the expense of other concurrent clients. Thus, all concurrent clients may perform optimally or experience equal reduction in performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for scheduling access requests for a shared resource, the method comprising:
assigning a first client to a first service class upon determining that the first client operates according to a first performance characteristic;
receiving a first access request for the shared resource from the first client;
storing the first access request in a first queue that corresponds to the first service class;
assigning a second client to a second service class upon determining that the second client operates according to a second performance characteristic;
receiving a second access request for the shared resource from the second client;
storing the second access request in a second queue that corresponds to the second service class;
determining that access requests issued by clients assigned to the second service class should be serviced before access requests issued by clients assigned to the first service class; and
scheduling the second access request to be serviced by the shared resource before the first access request is serviced by the shared resource.

2. The computer-implemented method of claim 1, wherein determining that access requests issued by clients assigned to the second service class should be serviced before access requests issued by clients assigned to the first service class comprises determining that not having access to the shared resource is causing clients assigned to the second service class to underperform relative to clients assigned to the first service class.

3. The computer-implemented method of claim 1, further comprising:
designating the first queue for storing access requests issued by clients that operate according to a first performance characteristic;
designating the second queue for storing access requests issued by clients that operate according to a second performance characteristic;

4. The computer-implemented method of claim 3, further comprising receiving an indication from the first client that the first client operates according to the first performance characteristic.

5. The computer-implemented method of claim 3, further comprising monitoring a set of actions performed by the first client when the first client issues access requests for the shared resource to determine that the first client operates according to the first performance characteristic.

6. The computer-implemented method of claim 3, further comprising designating the first queue for also storing access requests issued by clients that operate according to a third performance characteristic.

7. The computer-implemented method of claim 3, wherein determining that access requests issued by clients assigned to the second service class should be serviced before access requests issued by clients assigned to the first service class comprises identifying that the shared resource currently operates with increased latency.

8. The computer-implemented method of claim 7, wherein the second performance characteristic reflects a sensitivity to latency.

9. The computer-implemented method of claim 3, wherein determining that access requests issued by clients assigned to the second service class should be serviced before access requests issued by clients assigned to the first service class comprises identifying that the shared resource currently operates with limited bandwidth.

10. The computer-implemented method of claim 9, wherein the second performance characteristic reflects a sensitivity to bandwidth.

11. The computer-implemented method of claim 1, wherein each of the first performance characteristic and the second performance characteristic is one of a latency requirement, a bandwidth requirement, and a quality of service requirement.

12. A subsystem configured to schedule access requests for a shared resource, comprising:
a plurality of queues configured to store access requests;
an adaptive request mapping unit, coupled to the plurality of queues and coupled to a plurality of clients and configured to:
assign a first client to a first service class upon determining that the first client, operates according to a first performance characteristic,
receive a first access request for the shared resource from the first client,
store the first access request in a first queue in the plurality of queues that corresponds to the first service class,
assign a second client to a second service class upon determining that the second client operates according to a second performance characteristic,
receive a second access request for the shared resource from the second client,
store the second access request in a second queue in the plurality of queues that corresponds to the second service class, and
issue scheduling guidance to a request scheduling unit indicating that access requests issued by clients assigned to the second service class should be serviced before access requests issued by clients assigned to the first service class; and
the request scheduling unit, coupled to the plurality of queues and to the adaptive request mapping unit, and configured to:
schedule the second access request to be serviced by the shared resource before the first access request is serviced by the shared resource based on the scheduling guidance received from the adaptive request mapping unit.

13. The subsystem of claim 11, wherein the adaptive request mapping unit is further configured to:
designate the first queue for storing access requests issued by clients that operate according to a first performance characteristic;

designate the second queue for storing access requests issued by clients that operate according to a second performance characteristic;

14. The subsystem of claim 12, wherein the adaptive request mapping unit is further configured to:
designate the first queue for storing access requests issued by clients that operate according to a first performance characteristic;
designate the second queue for storing access requests issued by clients that operate according to a second performance characteristic; and.

15. The subsystem of claim 14, wherein the adaptive request mapping unit is further configured to receive an indication from the first client that the first client operates according to the first performance characteristic.

16. The subsystem of claim 14, wherein the adaptive request mapping unit is further configured to monitor a set of actions performed by the first client when the first client issues access requests for the shared resource to determine that the first client operates according to the first performance characteristic.

17. The subsystem of claim 14, wherein the adaptive request mapping unit is further configured to designate the first queue for also storing access requests issued by clients that operate according to a third performance characteristic.

18. The computer-implemented method of claim 14, wherein the adaptive request mapping unit determines that access requests issued by clients assigned to the second service class should be serviced before access requests issued by clients assigned to the first service class by identifying that the shared resource currently operates with increased latency.

19. The subsystem of claim 18, wherein the second performance characteristic reflects a sensitivity to latency.

20. The subsystem of claim 14, wherein the adaptive request mapping unit determines that access requests issued by clients assigned to the second service class should be serviced before access requests issued by clients assigned to the first service class by identifying that the shared resource currently operates with limited bandwidth.

21. The subsystem of claim 20, wherein the second performance characteristic reflects a sensitivity to bandwidth.

22. A computing device configured to schedule access requests for a shared resource, comprising:
a memory unit; and
a processing unit, coupled to the memory unit and configured to:
assign a first client to a first service class upon determining that the first client operates according to a first performance characteristic,
receive a first access request for the shared resource from the first client;
store the first access request in a first queue that corresponds to the first service class;
assign a second client to a second service class upon determining that the second client operates according to a second performance characteristic,
receive a second access request for the shared resource from the second client;
store the second access request in a second queue that corresponds to the second service class;
determine that access requests issued by clients assigned to the second service class should be serviced before access requests issued by clients assigned to the first service class; and
schedule the second access request to be serviced by the shared resource before the first access request is serviced by the shared resource.

23. The computing device of claim 22, wherein the memory unit stores program instructions that, when executed by the processing unit, causes the processing unit to:
assign the first client to the first service class upon determining that the first client operates according to the first performance characteristic;
receive the first access request for the shared resource;
store the first access request in the first queue;
assign the second client to the second service class upon determining that the second client operates according to the second performance characteristic;
receive the second access request for the shared resource;
store the second access request in the second queue;
determine that access requests issued by clients assigned to the second service class should be serviced before access requests issued by clients assigned to the first service class; and
schedule the second access request to be serviced by the shared resource before the first access request is serviced by the shared resource.

* * * * *

UNITED STATES PATENT AND TRADEMARK OFFICE
CERTIFICATE OF CORRECTION

PATENT NO. : 9,742,869 B2  
APPLICATION NO. : 14/101255  
DATED : August 22, 2017  
INVENTOR(S) : Evgeny Bolotin et al.

Page 1 of 1

It is certified that error appears in the above-identified patent and that said Letters Patent is hereby corrected as shown below:

On the Title Page

Please insert:
--Related U.S. Application Data
(60) Provisional application No. 61/893,786, filed on Oct. 21, 2013.--;

In the Claims

Column 15, Claim 3, Line 58, please delete "characteristic;" and insert --characteristic.--;

Column 16, Claim 13, Lines 63-67 through Column 17, Lines 1-3, please delete:
"The subsystem of claim 11, wherein the adaptive request mapping unit is further configured to:
designate the first queue for storing access requests issued by clients that operate according to a first performance characteristic;
designate the second queue for storing access requests issued by clients that operate according to a second performance characteristic;"

And insert:
--The subsystem of claim 12, wherein the adaptive request mapping unit is configured to determine that access requests issued by clients assigned to the second service class should be serviced before access requests issued by clients assigned to the first service class by determining that not having access to the shared resource is causing clients assigned to the second service class to underperform relative to clients assigned to the first service class.--;

Column 17, Claim 14, Line 11, please delete "characteristic; and." and insert --characteristic.--.

Signed and Sealed this
Third Day of July, 2018

Andrei Iancu
*Director of the United States Patent and Trademark Office*